Oct. 29, 1963     M. E. CHANDLER ETAL     3,108,435
FUEL CONTROL SYSTEM
Filed March 14, 1955     3 Sheets-Sheet 1
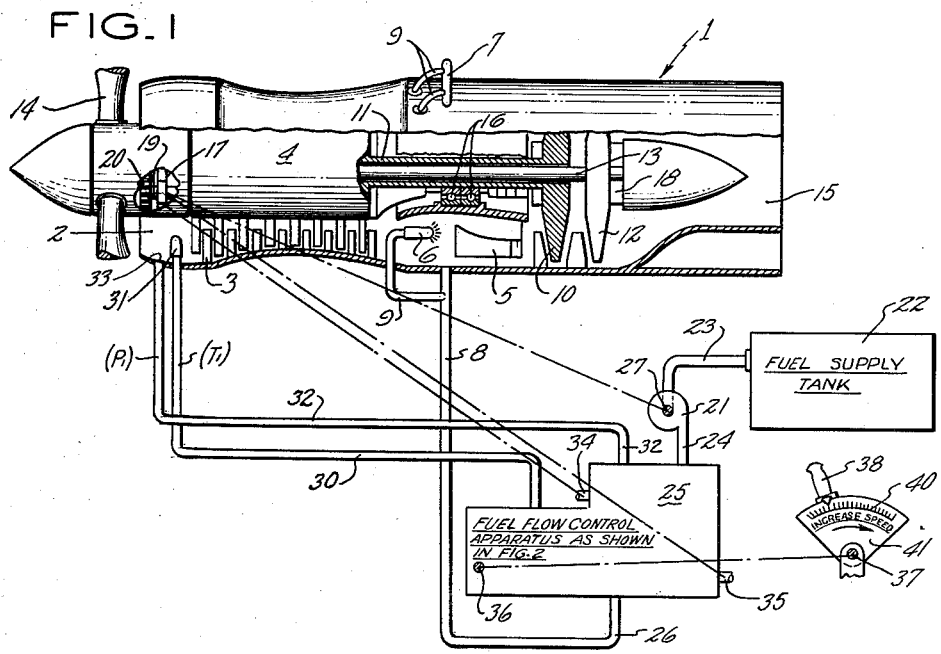
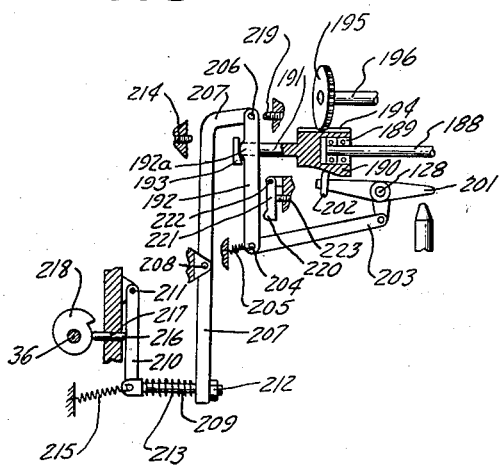
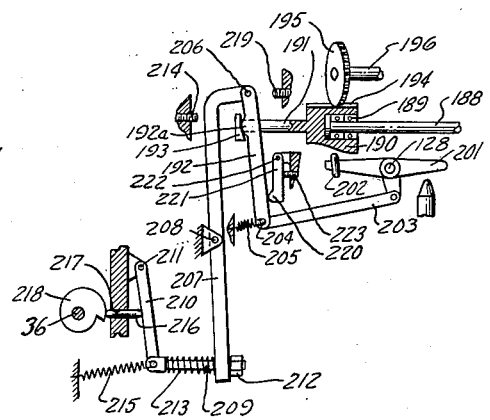
INVENTORS
M. E. CHANDLER
A. M. WRIGHT
BY *Alw Prentiss*
ATTORNEY

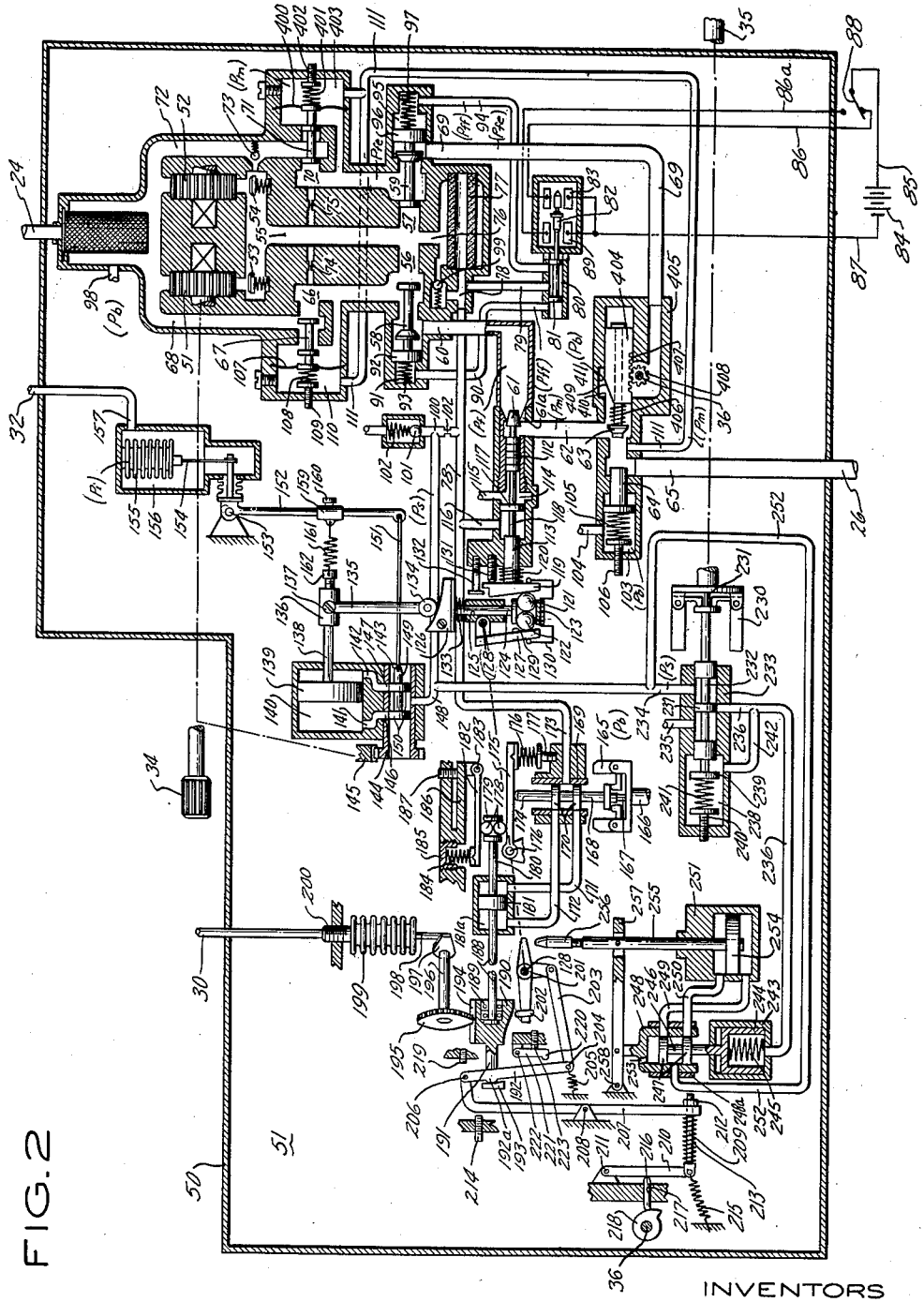

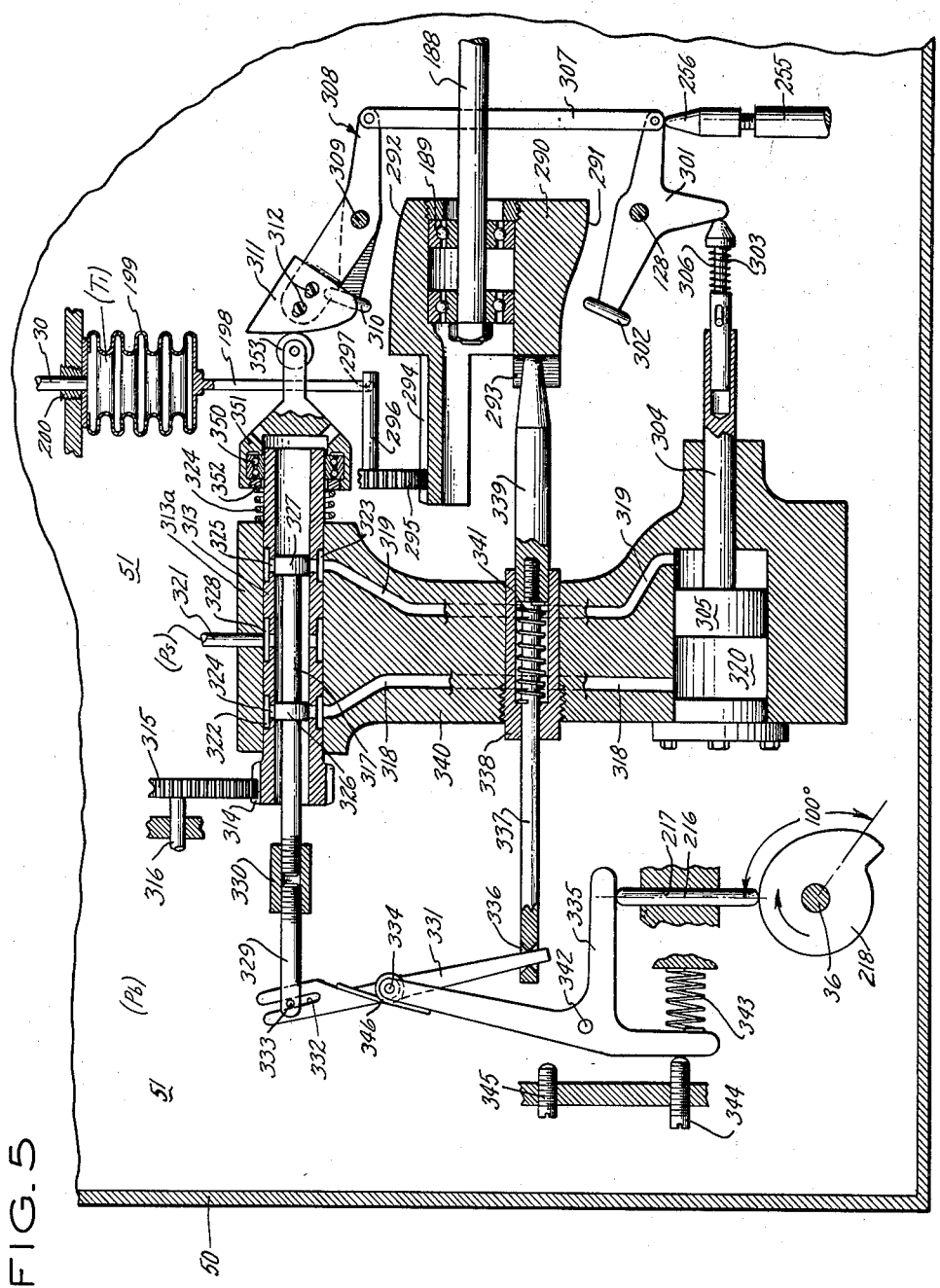

3,108,435
FUEL CONTROL SYSTEM
Milton E. Chandler, Kensington, and Alexander M. Wright, West Hartford, Conn., assignors, by mesne assignments, to Chandler-Evans Corporation, West Hartford, Conn., a corporation of Delaware
Filed Mar. 14, 1955, Ser. No. 494,055
3 Claims. (Cl. 60—39.16)

This invention pertains to automatic fuel and speed control apparatus for internal combustion engines and more particularly has reference to fuel and speed controls for aircraft continuous combustion engines of the gas turbine and jet types.

The invention is particularly applicable to continuous combustion engines for propeller-and-jet (prop-jet) propulsion of aircraft, having two gas turbines arranged in series, the first driving an axial flow compressor, and exhausting into the second which drives a propeller. Such engines usually include an air inlet, an air compressor, one or more combustion chambers, a primary gas turbine driving the compressor, a power gas turbine driving a propeller, and a tail pipe for discharging combustion gases to the atmosphere. Associated with these engines is a fuel system including a pump for delivering fuel to the combustion chambers, and a fuel flow regulator for regulating the supply of fuel to said chambers. This invention concerns fuel flow regulating apparatus to control the engine speed and power by regulating the fuel supply as a function of a manual control and several variables, including engine inlet air temperature and pressure, engine speed, and other engine operating conditions.

Owing to structural and metallurgical limitations, engines of the type referred to cannot be safely operated at speeds and temperatures exceeding predetermined limiting values, but for maximum economy of operation, both engine speed and temperature must be maintained at or near these limiting values. On the other hand, while engine speed is a critical factor in flight performance of aircraft, an engine cannot be operated at maximum speed in all flight maneuvers, at all flight altitudes or under all flight conditions. Fuel and speed control apparatus should, therefore, enable the operator to vary engine speed and power as desired from a required minimum to the predetermined limit of speed and full power.

The value of engine speed corresponding to any given value of fuel flow, varies as a function of the pressure and temperature of the engine inlet air, engine air compressor characteristics and other operating factors. Also, the maximum fuel flow to a turbojet engine is limited by the maximum permissible compression ratio of the air compressor which results from that fuel flow, under any combination of engine speed, engine inlet air temperature and pressure, and rate of air flow through the engine, that may obtain under varying flight operating conditions. Therefore, for proper regulation of engine operation, and to avoid compressor stall, burner blowout and other causes of engine failure, it is not feasible to rely upon automatic regulation of fuel flow as a function of variables which do not include the factors mentioned.

Another important requirement of a satisfactory fuel and speed control is ability to accelerate the engine at a maximum rate without causing compressor stall, and to decelerate the engine at a maximum rate without causing burner blowout.

Still another important requirement of a satisfactory fuel and speed control apparatus is the provision of an emergency fuel supply and control system which can be made to come into operation, in the event of a failure of the normal fuel supply and control system.

In turbojet engine fuel control systems heretofore in use, engine performance is controlled by regulating the fuel supply to the engine by a control apparatus which varies the delivery of a fuel pump by introducing correction factors which modify said delivery, in order to compensate the fuel flow to the engine for variations in pressure and temperature of the air entering the engine caused by variations in flight altitude, ambient air temperature, and other flight operating conditions. However, we have found that better control of engine operation can be obtained by providing a fuel control system in which inlet air pressure and temperature compensation of the fuel flow to the engine is inherent in the system, and hence such correction factors are not required to compensate for changing operating conditions.

In the turbojet engine art, fuel regulation is generally treated in terms of the rate of fuel flow, as related to engine speed (r.p.m.), and either or both of these entities may be modified by certain factors that affect engine performance, such as the temperature and pressure, or density of the air entering the compressor. Thus, the rate of fuel flow in relation to engine speed may be expressed by the equation:

$$W_f/\delta = (f)N$$

where $W_f$ is the rate of fuel flow to the engine, in pounds per hour; $\delta$ is the pressure of the entering air, as compared to standard, sea level, atmospheric pressure; and $(f)$ is some selected function of engine speed $(N)$, in r.p.m. Here the term $W_f/\delta$ is "modified" fuel flow and will be so understood in this specification.

Again, the relation of engine fuel to engine speed may be expressed, in terms of what is known as "corrected fuel flow" and "corrected engine speed," thus:

$$\text{Corrected fuel flow} = W_f/(P_1\sqrt{T_1})$$

and $$\text{Corrected engine speed} = N/\sqrt{T_1}$$

where $W_f$ and $N$ are defined above, and $P_1$ = Compressor inlet air pressure, in pounds per square inch, absolute
$T_1$ = Compressor inlet air temperature, in degrees, Rankine, and these terms will be so understood in this specification.

In the turbojet engine art, engine fuel flow is generally regulated by making its rate of flow bear a definite relation to corresponding values of one or more control parameters which affect engine performance; such relation being termed a "schedule," and the resulting regulation is referred to a "scheduling" of the flow. Accordingly, in this specification, the term "schedule" or "scheduling" means that the controlled entity has a definite, preselected value for each combination of corresponding values of the control parameters.

In controlling the acceleration of gas turbine engine, it is necessary to contend with compressor stall, and in the absence of a satisfactory way of detecting incipient stall, it is necessary to resort to some form of fuel scheduling to prevent the maximum fuel flow from exceeding a permissible limit. The ideal schedule, as long as such must be resorted to, would be a schedule of permissible compressor pressure ratio, as a function of corrected engine speed. The difficulties in the way of making this type of control are such that it is ruled out for many applications, and therefore only systems, in which fuel flow is scheduled as a function of some control variable, must be used. In a scheduling control, such as that disclosed herein, the problem of turbine temperature must also be considered. The desideratum is a variable schedule of acceleration fuel, depending on the compressor inlet temperature.

The following are the principal schemes that have been proposed for this purpose, together with the disadvantages attendant upon each:

(1) *Corrected fuel flow as a function of corrected speed.*—In the absence of a good way of scheduling compressor ratio as a function of corrected speed, an alternate way of scheduling engine acceleration for avoidance of compressor stall is to make the control meter corrected fuel flow as a function of corrected engine speed, with a temperature override to protect the turbine against excess temperature.

There are a number of ways in which this can be done, all of which involve the use of computing equipment to control the position of the main fuel valve and the value of the metering pressure, and all of which necessitate the use of exhaust gas temperature measuring equipment, preferably electrical. The weight and size of such equipment becomes disproportionate to the rating of the engine in many cases, especially for small aircraft engines.

(2) *Fuel flow scheduled as a function of compressor discharge pressure.*—This relationship has been used successfully for the automatic acceleration control of turbojet engines, where the stall characteristic of the engine is within certain limits. However, in many applications, where engines have to operate under widely varying flight altitudes and ambient air temperatures, it has been found impractical to get a single schedule of acceleration fuel flow in terms of corrected speed, that will permit satisfactory operation under such speed conditions, without considerable sacrifice of engine performance.

(3) *Modified fuel flow as a function of engine speed.*— While this is probably the simplest possibility, next to that in the preceding paragraph, but it has to be ruled out in many cases because of the engine characteristics, particularly where it is apparent that the steady state fuel flow at full engine speed on a cold day, is much in excess of the permissible acceleration fuel flow for a hot day. Here, a fuel schedule that would protect the engine against excessive temperature on a hot day would limit its operation on a cold day.

(4) *Actual fuel flow scheduled as a function of engine speed, inlet air pressure, and inlet air temperature.*—Because of the departure from ideal performance characteristics that are observed in actual engines, and because of the fact that in many designs the maximum permissible fuel flow is partially limited by compressor stall and partly by turbine gas temperature, the application of correction factors to allow for these departures often becomes cumbersome in the control systems referred to in (1), (2) and (3) above.

It is often desirable to make the control limit the maximum fuel flow, as some specified function of engine speed and inlet air temperature, with the resulting fuel flow corrected for inlet air pressure. More simply expressed by a formula, the desired limiting maximum fuel flow is usually expressed as follows:

$$W_f = P_1 \times f(N, \sqrt{T_1})$$

In this formula, the function denoted by $f$ is determined by the engine characteristics.

For these reasons, this is the type of fuel control that is employed in our invention, as hereinafter described. As will be disclosed hereinbelow, after the control has been built in accordance with our invention, the functional relation between fuel flow ($W_f$) and engine speed ($N$) and temperature ($T_1$), respectively, may be altered without the necessity for redesigning the control.

The objects of this invention are to provide an improved fuel and speed control apparatus for turbojet engines embodying the following features:

(1) A control apparatus comprising, in a single self-contained package, a normal fuel supply and control system, and an emergency fuel supply and control system which the pilot may bring into operation in the event of failure of the normal system; each system comprising a series of component coordinated hydraulic devices for regulating fuel delivery to the engine; said devices being collectively responsive to a single manual control, to inlet air pressure and temperature, and to speed of the engine.

(2) A control apparatus which comprises a combination of devices that measure inlet air absolute temperature and pressure, and engine speed (r.p.m.) and positions a main fuel metering valve, and thus varies its flow area, in accordance with a selected function of said temperature, pressure and speed; while the pressure differential across said valve is held substantially constant.

(3) A fully automatic, hydraulic control apparatus in which the fuel flow to the engine is compensated for variations in absolute inlet air pressure and temperature, and engine speed, and said compensation is inherent in the operation of the apparatus, so that additional correction factors for these variables are not required in order to compensate for variations in operating conditions.

(4) A fully automatic, hydraulic control apparatus which uses as control "parameters," for limiting the maximum fuel flow to the engine, the entities: inlet air pressure, and preselected functions of inlet air temperature and engine speed, as defined hereinabove.

(5) A control apparatus which produces a substantially constant engine speed, corresponding to any selected position of a single manual control lever, under all engine operating conditions.

(6) A control apparatus which functions so that the engine can be accelerated at a maximum rate, corresponding respectively to the pressure and temperature of the air entering the engine compressor, without causing compressor stall or excessive turbine temperature; and decelerated at a maximum rate without causing burner blow-out.

(7) A control apparatus wherein the fuel flow to the engine under normal operation is regulated by:

(A) a substantially constant metering head across a variable area metering orifice; and
(B) a metering orifice whose area is varied:
  (a) during engine acceleration, in accordance with the temperature and pressure of the air entering the engine compressor; and in accordance with engine speed, at each instant.
  (b) during steady state engine operation, by a centrifugal speed governor geared to the engine, whose action is responsive to the position of a manual control lever; and
  (c) during engine deceleration, by said governor, and limited by an adjustable cam and stop.

(8) A control apparatus wherein the fuel regulating mechanism operates in its own fluid, acts directly on the fuel supplied by a constant delivery pump, and regulates its flow to the engine by means of a plurality of suitably controlled by-pass valves.

(9) A fuel and speed control apparatus having control devices which vary the fuel flow in accordance with variations in temperature and pressure of the ambient atmosphere, to prevent engine failure at high altitudes and low atmospheric temperatures.

(10) A control apparatus having an override speed control device which prevents the engine from operating at excessive speeds.

With these and other objects in view which may be incident to our improvements, our invention consists in the combination and arrangement of elements hereinafter described and illustrated in the accompanying drawings, in which:

FIGURE 1 shows, somewhat diagrammatically, an engine suitable for propeller-and-jet propulsion of aircraft, with its associated fuel control apparatus, operating in conjunction with a constant displacement fuel pump and a manual control lever, and the principal connections therebetween;

FIGURE 2 shows, also diagrammatically, a control apparatus embodying the principles of our invention;

FIGURE 3 shows the left-hand portion of the apparatus shown in FIGURE 2, with the elements in the position taken during the acceleration phase of operation;

FIGURE 4 shows the same elements as in FIGURE 3 in the position taken during the deceleration phase of operation;

FIGURE 5 shows an alternative governing mechanism that may be substituted for that shown in FIGURES 2, 3 and 4.

The fuel and speed control apparatus herein disclosed comprises, in a single unit, a normal and an emergency fuel supply and control system, connected in parallel between a fuel pump and the combustion nozzles of the engine, and so arranged that fuel is normally supplied to the engine only through the normal system, but in the event of failure of the normal system, the emergency system can be brought into operation and continues to supply fuel to the engine until the normal system is restored to operation.

The normal control system is a fully automatic, hydraulic system, comprising a series of coordinately controlled devices which coact to produce such a regulated fuel flow to the engine as is required to obtain selected, desirable operating characteristics of the engine, under a wide variety of operating conditions. The normal control system regulates the fuel flow to the engine by using as control "parameters" the entities: inlet air pressure, and preselected functions of inlet air temperature and engine speed, which are respectively defined in column 2. By using these entities as control parameters, the altitude and atmospheric temperature compensation of fuel flow to the engine is inherent in the system, and correction factors are not required to compensate for variations in such operating conditions, as in turbojet engine fuel control systems heretofore employed.

The basic philosophy of the normal fuel control system, according to our invention, is shown in the following overall analysis.

The maximum fuel flow to a turbojet engine is limited by the permissible compressor ratio that results from that fuel flow $W_f$, at any engine speed N, inlet air temperature $T_1$, and inlet air pressure $P_1$. Since an aircraft turbojet engine must operate over a wide range of speeds N, and altitudes, the quantities $P_1$ and $T_1$ are also variable over a very wide range. If, at any conditions of N, $P_1$, and $T_1$, the fuel flow $W_f$ exceeds a certain magnitude, compressor stall results, and the engine becomes inoperative. For a particular engine design, the relation (during acceleration) between the maximum permissible fuel flow ($W_f$), engine speed (N), inlet air absolute temperature ($T_1$) and pressure ($P_1$), can be expressed by the equation:

$$W_f = P_1 \times f(N, \sqrt{T_1}) \qquad (1)$$

Where the function $f$ depends upon the operating characteristics of the engine and its values are chosen so as to match such requirements as closely as possible; whereby the control apparatus can meet the engine acceleration requirements, without exceeding its operating limits. In other words, in our invention, the basic acceleration fuel flow is scheduled in accordance with compressor inlet air pressure ($P_1$), multiplied by preselected function ($f$) of engine speed and inlet air temperature.

The deceleration fuel flow is also a similar function of engine speed, and compressor inlet air temperature and pressure, and is always such as to preclude burner blowout.

All-speed, steady-state governing of the primary engine is accomplished by a centrifugal governor with droop stabilization of engine speed.

A simple, manually-operated, emergency control is incorporated in our control apparatus as an integral part of the package.

In accordance with the above-mentioned basic philosophy, it will be seen that our invention, broadly comprehended, comprises in one helf-contained package, a fuel and speed control apparatus for a turbojet engine, having a main and an emergency fuel supply and control system, connected in parallel between said engine and a fuel pump, in each of which systems a series of coacting, hydraulically actuated devices automatically regulate the delivery of fuel to the engine from a constant delivery fuel pump under all engine operating conditions.

Referring now to FIGURE 1 of the drawings, there are shown, as the principal elements of the engine mentioned above: a supporting body 1, an air inlet 2, a multistage air compressor 3, a compressor rotor shaft 4, one each of a number of combustion chambers 5, a series of combustion nozzles 6, connected to a generally circular fuel manifold 7, by means of conduit 8 and branch conduits 9, a primary gas turbine 10, connected to compressor 3 by a drive shaft 11, a power turbine 12, connected by a drive shaft 13 to a propeller 14; a tail pipe 15 for discharging exhaust gases from gas turbine 12; a center bearing 16 and end bearings 17 and 18, supported by body 1; a propeller shaft 19; carrying propeller 14, and a gear train 20, connecting shafts 4 and 19 for rotating propeller 14 at a speed proportional to engine speed and for operating the fuel pump and other accessories.

A centrifugal fuel boost pump 21 draws fuel from a supply tank 22 through a conduit 23, and delivers it through a conduit 24 to the fuel flow control apparatus diagrammatically indicated at 25 and shown in detail in FIGURE 2. From fuel control apparatus 25, the fuel flows through a conduit 26 and conduit 8 to fuel manifold 7 of the engine. Pump 21 is operated by a drive shaft 27 connected to gear train 20 in the engine, or to any other suitable source of power.

The fuel flow control apparatus indicated as 25 in FIGURE 1, and shown diagrammatically in FIGURE 2, is connected by a conduit 30 to a temperature bulb 31 which contains an expansible fluid responsive to the temperature of the air entering the compressor 3 through air inlet 2. Control apparatus 25 is also connected by a conduit 32 to a tube 33, located in air inlet 2, which measures the static pressure of the air entering inlet 2. As subsequently explained, the fuel control apparatus 25 is responsive to the inlet air (ambient atmospheric) absolute temperature ($T_1$) and to the absolute static pressure ($P_1$) of the inlet air.

A main drive shaft 34 in fuel control apparatus 25 is driven by the primary turbine 10 at a speed proportional to the speed of said turbine; an auxiliary drive shaft 35 in control apparatus 25 is driven by the power turbine 12, at a speed proportional to the sped of said turbine; and a manual control shaft 36 is rotated in response to movement of a shaft 37 to which is fixed the engine control lever 38. Control lever 38 is manually operable in reference to a scale 40 on a fixed quadrant 41, said scale being calibrated in terms of engine speed (r.p.m.).

Referring to FIGURE 2, there is shown, somewhat diagrammatically, an embodiment of our invention, indicated by the reference numeral 25 in FIGURE 1, all the elements of which are enclosed in a casing 50 which is connected by conduit 30 to temperature bulb 31 in air inlet 2, and by conduit 32 to tube 33 for supplying static air pressure ($P_1$) to the control apparatus from air inlet 2. The control apparatus shown in FIGURE 2 is a self-contained hydraulic system employing the interior of casing 50 as a reservoir 51 which is maintained approximately full of liquid fuel at the boost pressure ($p_b$) of pump 21, in order to permit the working elements to operate in a lubricating bath.

CHANGE-OVER VALVE MECHANISM

Referring first to FIGURE 1, fuel flows from tank 22 through conduit 23 to fuel pump 21, either under a gravity head as shown in FIGURE 1, or from an auxiliary (boost) pump (not shown) between tank 22 and main fuel pump 21. As shown in FIGURE 2, fuel issuing from pump 21, under a pump discharge, or boost pressure, ($p_b$), flows through an inlet passage 24 to a pair of gear pumps 51 and 52 which are arranged in parallel and each connected to main drive shaft 34. Pumps 51 and 52 discharge, through check valves 53 and 54 respectively, into a common passage 55 which divides into branch passages 56 and 57 leading respectively to changeover valves 58 and 59, which are arranged to open and close alternatively, as further described hereinbelow.

When valve 58 is open (and valve 59 is closed) fuel flows through passage 60, main metering valve 61, passage 62, manual metering valve 63, foot valve 64 and passage 65 to conduits 26 and 8, and thence to burner nozzles 6 in combustion chamber 5 (FIG. 1). Fuel not required by the engine is returned to inlet passage 24 through passage 66, main pressure-regulating valve 67 and passage 68. Similarly, when valve 59 is open (and valve 58 is closed), fuel flows through passage 69, emergency metering valve 63, passage 65 and conduit 8 to burner nozzles 6; and fuel not required by the engine is returned to inlet passage 24, through passage 70, emergency pressure-regulating valve 71 and passage 72. From the foregoing description, it will be seen that valves 58 and 59, operating coordinately, constitute a mechanism for changing the engine fuel supply from the main to the emergency system, and vice versa.

Passage 55 is connected through a spring-biased check valve 73 which is calibrated to open when the pressure in passage 55 reaches a selected maximum value, so that such pressure cannot be exceeded. Passage 55 is also connected to passages 66 and 70 through restrictions 74 and 75, respectively, whereby a selected pressure differential is maintained between passage 55 and passages 66 and 70, respectively.

Passage 55 is also connected through a passage 76, filter 77, and passages 78 and 79 with an open-ended cylinder 80, wherein is slidably mounted a spool valve 81 which is actuated by a double-acting solenoid 82, whose right-hand winding 83 is energized by an electric current from a battery 84, through wires 85, 86 and 87, when a switch 88 is in its lower position (as shown in FIG. 2); and whose left-hand winding 89 is similarly energized through wires 85, 86a and 87, when switch 88 is in its upper position. Cylinder 80 is connected by a passage 90 to a cylinder 91, wherein is slidably mounted a piston 92 which is biased to its right position by a spring 93 and the pressure ($p_{ff}$) from conduit 90, acting on its left-hand face, and to its left position by the pressure ($p_f$) in passage 60, acting on its right-hand face. Cylinder 80 is also similarly connected through a passage 94 with a cylinder 95 wherein is slidably mounted a piston 96 which is biased to its left position by a spring 97 and the pressure ($p_{ff}$) from conduit 94, acting on its right-hand face, and to its right position by the pressure ($p_{fe}$) in passage 69.

From the foregoing description, it is seen that when the pilot throws switch 88 to its lower position, valve 81 will be drawn to its right position (as shown in FIG. 2), whereby fuel under pressure ($p_{ff}$) is admitted to cylinder 95. This pressure, augmented by spring 97, creates a force greater than that of the pressure ($p_{fe}$) in passage 69, whereby valve 59 is moved to its left (closed) position, as shown in FIG. 2. At the same time, when valve 81 moves to its left position, it permits fuel to escape from cylinder 93, through passage 90 and the left open end of cylinder 80, into the reservoir 51 formed by casing 50, where the pressure is constantly maintained at boost pressure ($p_b$) by a passage 98 which connects said reservoir to inlet passage 24. This escape of fuel from cylinder 91 reduces the pressure therein to pressure ($p_b$) so that the higher pressure ($p_f$) in passage 60, acting on the right face of piston 92, overcomes spring 93 and the pressure ($p_b$) in cylinder 91, and moves valve 58 to its left (open) position, as shown in FIG. 2.

Conversely, when the pilot throws switch 88 to its upper position, and the resulting energizing of winding 89 draws valve 81 to its left position, fuel under pressure ($p_{ff}$) is admitted to cylinder 91 and fuel escapes from cylinder 95, whereby valves 58 and 59 are simultaneously moved to their right positions, and the fuel supply to the engine is changed over from the main to the emergency system. The flow resistance of filter 77 reduces the pressure ($p_f$) of the fuel in passage 76 to a selected lower pressure ($p_{ff}$) in passage 78; and if the flow resistance of filter 77 increases by clogging beyond a selected value, fuel from passage 76 bypasses filter 77 through check valve 99 which is biased toward closed position by a spring whose rate is such as to produce the desired drop in pressure from ($p_f$) in passage 76 to ($p_{ff}$) in passage 78.

Connected to passage 78 is a passage 100, which communicates with reservoir 51, through a spring-biased check valve 101. In passage 78, a restriction 102 reduces the pressure in passage 100 to a servo-pressure ($p_s$), which is maintained at a selected value by the rate of spring 102.

FOOT VALVE DEVICE

Foot valve 64 is slidably mounted in a cylinder 103 which communicates with reservoir 51 through a passage 104, whereby the pressure in said cylinder is maintained at boost pressure ($p_b$). A spring 105, whose force is adjusted by adjustable abutment 106, biases valve 64 toward closed position. However, as long as fuel is being supplied to the engine, its pressure ($p_m$) in passage 62 exceeds the pressure ($p_b$) in cylinder 103 by an amount sufficient to overcome spring 105 and maintain valve 64 in open position, as shown in FIG. 2; but when no fuel is being supplied to the engine (i.e., engine is stopped), the pressure ($p_m$) in passage 62 drops to the pressure in reservoir 51, whereupon spring 105 moves valve 64 to its closed position, so that no fuel can escape through passage 65.

NORMAL CONTROL SYSTEM

The normal fuel control system comprises main fuel supply passages 60, 62 and 65, bypass passages 66 and 68, main pressure-regulating valve 67, and main metering valve 61, all as mentioned above, together with the devices which actuate said valves, as described hereinbelow.

Main Pressure-Regulating Valve

Bypass valve 67 is held in equilibrium by pump pressure ($p_f$) in passage 66, acting to the left on a diaphragm 107 attached to said valve, opposed by a spring 108, whose force is adjusted by an adjustable abutment 109, and the metered fuel pressure ($p_m$) in a chamber 110, which communicates through a passage 111 with passage 62. The fuel pressure differential ($p_f - p_m$) acting on diaphragm 107, is determined by the force of spring 108, which in turn is fixed by the setting of abutment 109, and since the metering head ($p_f - p_m$) across valve 61 is the same as the fuel pressure differential ($p_f - p_m$) acting on diaphragm 107, said metering head is maintained at a substantially constant value as determined by the setting of abutment 109. Also, since metering head ($p_f - p_m$) remains constant, the rate of fuel flow to the engine at any instant is determined solely by the position of valve 61 at that time. The adjustment of the value of the metering head ($p_f - p_m$) by abutment 109 provides a ready means for compensating the fuel flow to the engine for variations in density that occur when the control apparatus is required to meter a variety of liquid fuels.

Main Metering Valve

The position of the main metering valve 61, at any instant of engine operation, is determined by a selected function ($f$) of speed of the primary turbine 10, modified by inlet air pressure ($P_1$) and a selected function ($\phi$) of the temperature ($T_1$) of said air, such as to satisfy Equation 1 above, as described hereinbelow.

Valve 61 is integral with a piston 112 and plunger 113 assembly which is slidably mounted in a cylinder 114. The right-hand part of cylinder 114 is connected by a passage 115 with reservoir 51, and the left-hand part of said cylinder is connected by a passage 116 to passage 78. Hence, a land 117, which is rigidly connected by a rod 118 to piston 112 and plunger 113, and whose face areas are larger than those of said piston and plunger, is biased to the right by the pressure ($p_{ff}$), acting on land 117 in that direction, which exceeds the pressure ($p_b$) acting on said land in the opposite direction. Since the downstream face of valve 61 has an area equal to that of the opposing face of piston 112, the pressure ($p_m$) in passage 62 has no effect on the position of valve 61. Since the left-hand face area of plunger 113, which is subject to pressure ($p_b$) in reservoir 51, is equal to the upstream face area of valve 61, which is subject to the higher pressure ($p_f$) in passage 60, said valve and plunger assembly is biased to the left by the pressure differential ($p_f - p_b$), in opposition to the pressure differential ($p_{ff} - p_b$) acting on land 117. The areas on which the pressures ($p_f$), ($p_{ff}$), and ($p_b$) act are so related to each other as to hydraulically balance the valve 61-plunger 113 assembly.

*Pressure ($P_1$) Modifier*

A cam 119 is rigidly attached to the left end of plunger 113, and a spring 120 interposed between said cam and a fixed abutment, biases said cam to the left, so as to always hold it in contact with a ball bearing 121, which, with a similar contacting ball bearing 122, is mounted in a sleeve 123 on the lower end of a rod 124 that is slidably mounted in a fixed bore 125 and carries a contoured cam 126. A lever 127, fixedly mounted on a rock shaft 128, has a plane face 129 which is held in contact with ball bearing 122 by a clip spring 130 that embraces the outer faces of lever 127 and cam 119.

When lever 127 is swung, by rotation of rock shaft 128 in a counter-clockwise direction, its rightmost position, cam 119 is brought into contact with its stop 131 and valve 61 is closed (as shown in FIG. 2). Conversely, when lever 127 is swung by shaft 128 to the left of the position shown in FIG. 2, spring 120 causes cam 119 to move to the left, thus opening valve 61, until said cam contacts its stop 132 at which point valve 61 reaches its maximum open position. Also, when lever 127 is held by shaft 128 in any position to the left of that shown in FIG. 2, an upward movement of sleeve 123 (and balls 121 and 122) moves cam 119 and valve 61 to the right, reducing the opening of valve 61, since the contour of cam 119 is such that the horizontal distance between any point on the face of said cam and the opposite point on face 129 of lever 127 is a minimum at the level of rock shaft 128.

Cam 126 is biased in an upward direction by a spring 133 and its vertical movement is determined by a roller follower 134, carried on the lower end of an arm 135 of a sleeve 136, which is attached by a set screw 137 to a rod 138 of a piston 139 mounted in a cylinder 140. Passages 141 and 142 connect cylinder 140 with a bore 143 wherein is slidably mounted a sleeve 144 which is rotated by a pinion 145 connected to main drive shaft 34. A series of ports 146 and 147 in sleeve 144 connect the interior of said sleeve, respectively with passages 141 and 142, and a conduit 148 which connects with passage 78. A spool pilot valve 149 has a pair of spaced lands 150 which cover ports 146 and 147 when said valve is in its neutral position (as shown in FIG. 2). When said valve is moved to the left of said position, fuel under servo-pressure ($p_s$) is admitted through conduit 148 and passage 141 to the left end of cylinder 140, and fuel escapes from the right end of said cylinder through passage 142 and the open end of sleeve 144 into reservoir 51. This moves piston 139 to the right. Conversely, when valve 149 is moved to the right, fluid under pressure ($p_s$) is admitted to the right end of cylinder 140 and escapes from the left end of said cylinder into reservoir 51, which moves piston 139 to the left.

Pilot valve 149 is moved by a rod 151 attached to the lower end of a bell-crank lever 152 which is pivoted to a fixed pivot 153 and has attached to its other arm a rod 154, connected to an evacuated bellows 155 in a chamber 156 that is connected by a passage 157 to conduit 32 and tube 33. A sleeve 159, slidably mounted on the vertical arm of bell-crank lever 152, is fixed in adjusted position by a set screw 160, and is connected by a tension spring 161 to an adjustable screw 162 which engages sleeve 136.

By virtue of the above described arrangement, it will be seen that a fall in static pressure ($P_1$) of the air entering inlet 2 of the engine will expand bellows 155, which rotates bell-crank lever 152 in a clockwise direction. This moves balls 121 and 122 in an upward direction and moves cam 119 to the right and decreases the opening of valve 61. Conversely, a rise in $P_1$ increases the opening of said valve.

From the foregoing description in columns 9 and 10, it will be appreciated that apparatus 119–162 constitutes a means for modifying the position of main metering valve 61, from its position as determined by the angular position of rock shaft 128, in accordance with changes in pressure ($P_1$) of the air entering the engine.

*Speed Governing Mechanism*

The speed governing mechanism of our control apparatus comprises generally a main, engine-driven, centrifugal speed governor, a manually operated cam for setting the desired engine speed, and a connecting linkage, including a 3-dimension cam for regulating the maximum fuel flow during acceleration and the minimum fuel flow during deceleration of the engine.

The main speed governor comprises a pair of flyweights 165 driven by a shaft 166, connected to the main drive shaft 34, and having an upwardly projecting spline 167 which slidably engages a spool pilot valve 168, whereby said valve is rotated to prevent sticking. Valve 168 is slidably mounted in a fixed sleeve 169 and has a pair of spaced lands 170 which register with the port ends of conduits 171 and 172, when in neutral position. A passage 173 connects sleeve 169 with passage 78 and supplies fuel under servo-pressure ($p_s$) to said sleeve. Valve 168 has an upwardly extending spindle 174 which contacts a lever 175, pivoted at its left end to a fixed pivot 176, and bearing at its right end against a spring which has an adjustable abutment 177. A pair of ball bearings 178 are slidably mounted in a sleeve 179, carried by a piston rod 180 which is attached to a piston 181. Lower ball 178 contacts lever 175 and upper ball 178 bears against a lever 182 which is pivoted at its right end to a pivot 183 and at its left end bears against a spring 184 having an adjustable abutment 185. Pivot 183 is carried by a resilient arm 186 whose right end is adjustable by a set screw 187.

Piston 181 is connected by a rod 188 and a pair of ball bearings 189 to a 3-dimension cam 190, having a leftwardly extended spindle 191, which is slidably mounted in a lever 192 and terminates in a contoured cam 193. Cam 190 is provided on its outer, upper portion with a sector rack 194 whose teeth engage with a cog wheel 195, mounted on a shaft 196 which is rotated through a limited angle by an arm 197, connected by a rod 198 to a bellows 199. The interior of bellows 199 is connected by conduit 30 to a temperature bulb 31, which is located in air inlet 2 of the engine (see FIG. 1) and is filled with a temperature responsive expansible liquid, such as toluene, so that the travel of the lower end of bellows 199 is proportional to the temperature ($T_1$) of the air entering inlet 2. The fixed end of bellows 199 is adjustable in position by a set screw 200.

A three-arm, bell-crank lever 201, fixedly mounted on rock shaft 128, carries, near the end of its left, horizontal arm, a roller 202, which (when lever 201 is in the position shown in FIG. 3), bears against the lower, contoured surface of cam 190. The lower end of the vertical arm of lever 201 is connected by a link 203 to lever 192 at its lower end 204, which is biased to the left by a tension spring 205. Lever 192, which is pivoted at its upper end 206 to the upper end of a lever 207, has on its left face a projection 192a which engages cam 193 when cam 190 moves to the right.

Lever 207 is pivoted near its center to a fixed pivot 208 and is connected by a rod 209 to a lever 210 which is pivoted at its upper end to a fixed pivot 211. Rod 209 is slidably mounted in the lower end of lever 207 and its connecting length is adjustable by a threaded nut 212. A spring 213, interposed between levers 207 and 210, keeps the former in contact with nut 212, and permits a limited movement of lever 210, when the upper end of lever 207 is in contact with an adjustable stop 214. A tension spring 215 biases the lower end of lever 210 to the left, and a pin 216, which is slidably mounted in a fixed bore 217, swings lever 210 about its pivot 211, in response to the rotation of a cam 218 which is fixedly mounted on shaft 36 (see FIG. 1). The movement of the upper end of lever 207 to the right is limited by an adjustable stop 219. When the upper end of lever 192 is pushed to the right by lever 207 (and before the latter contacts stop 219) lever 192 contacts a projection 220 on the lower end of a lever 221 which is pivoted at its upper end to a fixed pivot 222. The position of projection 220 is adjusted by a set screw 223.

The operation of the speed governing mechanism described in columns 10 and 11 is as follows.

*Steady-State Operation*

An increase in engine speed causes fly-weights 165 to move outwardly and lift valve 168 which uncovers ports 171 and 172. This admits fuel under servo-pressure ($p_s$) into the left end cylinder 181a and also permits fuel in the right end of said cylinder to escape through conduit 171 and the lower open end of sleeve 169 into reservoir 51, whereupon piston 181 moves to the right, carrying with it balls 178 and 179 and also cam 190. This movement of balls 178 by reducing the distance between said balls and pivot 183, increases the effective downward thrust of spring 184 (through said balls) on lever 175; at the same time, the increase in distance between balls 178 from pivot 176 increases the effective force of said thrust on lever 175 and spring 176. The resulting compression of spring 176 permits lever 175 to move valve 168 downwardly until said valve is restored to its neutral position, as shown in FIGURE 2.

During steady state operation, the speed of the primary turbine 10 corresponds to what is called for by the position of manual control lever 38 (FIG. 1) which sets the position of cam 218. As shown in FIG. 2, in this phase of operation, the cam 190 has moved to the right until the cam 193 contacts projection 192a on rod 192, and any further increase in speed will move rod 191, further to the right, as described in the preceding paragraph, which swings lever 192 to the right about its pivot 206. This rotates bell-crank lever 201 in a counter-clockwise position, which removes roller 202 from contact with cam 190, and also rotates shaft 128 and lever 127 in a counter-clockwise direction. The resulting movement of the lower end of lever 127 to the right pushes balls 121 and 122 and cam 119 to the right which reduces the opening of valve 61 and decreases the fuel flow to the engine, whereupon the speed of the engine will decrease to the speed called for by the setting of the cam 218, and the governor 165 mechanism will again be in a state of equilibrium.

Conversely, a reduction in engine speed will cause fly weights 165 to move inwardly and lower valve 168 which causes piston 181 to move to the left. The resulting movement of rods 188 and 191 to the left permits spring 205 to rotate bell-crank lever 201 and shaft 128 in a clockwise direction, which moves lever 127, balls 121 and 122, cam 119 and valve 61 to the left and increases the fuel flow to the engine, whereupon the engine speed increases until it reaches the speed called for by the setting of cam 218 and the system is restored to equilibrium.

*Acceleration Operation*

In order to increase the speed of the engine, above any given speed at which it is operating in its steady-state phase (FIG. 2), cam 218 is rotated in a clockwise direction by advancing manual control lever 38 (to the right). When cam 218 is rotated, it calls for more fuel than the equilibrium position of the speed governor 165 is supplying. At the same time, the throw of cam 218, being decreased, pin 216 and lever 210 are pulled to the left by spring 215, which rotates lever 207 in a clockwise direction. This causes lever 192 to also rotate in a clockwise direction about its projection 192a, which is in contact with cam 193 in the steady-state phase of operation (i.e., when acceleration commences). Thereupon, spring 205 pulls link 203 to the left, which rotates bell-crank lever 201 in a clockwise direction until roller 202 contacts the contoured surface of cam 190, as shown in FIGURE 3. At the same time, lever 127 is rotated by shaft 128 in a clockwise direction, which opens main metering valve 61, and the resulting increase in fuel flow causes the engine to accelerate. This increase in speed causes cam 190 and piston 181 to move to the right, and reset speed governor 165 at the higher speed called for by the new position of cam 218, as described in column 11. The higher the new speed, the further to the right cam 190 will move and hence permit a higher fuel flow. But the contact of roller 202 with cam 190 always limits the maximum rate of fuel flow to the preselected safe value, as determined by the desired acceleration curve, which is such as to preclude the danger of compressor stall.

*Deceleration Operation*

In order to decrease the speed of the engine, below any given speed at which it is operating in its steady-state phase (FIG. 2), cam 218 is rotated in a counter-clockwise direction by retarding manual control lever 38 (to the left). When cam 218 is so rotated, it calls for less fuel than the equilibrium position of the speed governor 165 is supplying. At the same time, the throw of cam 218 being increased, it pushes pin 216 and lever 210 to the right, which rotates 207 in a counter-clockwise direction. This causes lever 192 to also rotate in a counter-clockwise direction about its projection 192a, which is in contact with cam 193 in the steady-state phase of operation (i.e., when deceleration commences). Thereupon, link 203 is pushed to the right, which rotates bell-crank lever 201 in a counter-clockwise direction (further removing roller 202 from cam 190), until lever 192 contacts projection 220 on stop lever 221, which then becomes its pivot, as shown in FIGURE 4. At the same time, lever 127 is rotated by shaft 128 in a counter-clockwise direction, which reduces the opening of main metering valve 61 and the resulting decrease in fluel flow causes a corresponding reduction in engine speed. This decrease in speed causes piston 181 to move to left and reset speed governor 165 at the lower speed called for by the new position of cam 218. The slower the new speed, the further to the left piston 181 will move and hence cause a lower fuel flow. But the contact of lever 192 with stop lever 221 always limits the minimum rate of fuel flow to the preselected safe value, as determined by the desired deceleration curve, which is such as to preclude the danger of burner blowout.

*Temperature ($T_1$) Modifier*

In addition to its longitudinal contour in an axial direction (as shown in FIGS. 2, 3 and 4), cam 190 is also contoured transversely in a radial direction, so that, upon a decrease in the temperature ($T_1$) of the air entering inlet 2, and the resulting contraction of bellows 199, which rotates cog wheel in a counter-clockwise direction, and cam 190 in a clockwise direction (as viewed from its left), the radius of the contoured surface of cam 190 from its axis of rotation is decreased. This permits roller 202 (which contacts cam 190 during acceleration) to rise and rotate bell-crank lever 201 in a clockwise direction, which opens main metering valve 61 and increases the fuel flow to the engine and thereby compensates said fuel flow for the increased density of the air entering inlet 2, by reason of its lower temperature. Conversely, a rise in said temperature ($T_1$) similarly decreases the flow area through main metering valve 61 and reduces the fuel flow to the engine, thereby compensating the fuel flow for the decreased density of said air, because of its higher temperature ($T_1$).

As described in column 5, bellows 155 increases the fuel flow to the engine with a rise in atmospheric pressure ($P_1$) and vice versa, which compensates said fuel flow for variations in the density of air entering inlet 2 because of changes in barometric pressure, in accordance with ratio ($P_1/P_a$), as shown on the left hand side of Equation 1 in column 5. Also, the cam 119 and cam 190 are so contoured as to generate respectively the ($f$) function of engine speed (N), and the ($\phi$) function of inlet air temperature ($T_1$), as shown on the right hand side of Equation 1 in column 5. It will be further noted that adjustable stops 214 and 219 limit the movement of lever 207, and thus determine the minimum (ground idle) and maximum speeds (r.p.m.'s) of the primary turbine 10, respectively.

*Overspeed Governor (Power Turbine)*

In order to regulate the speed of the power turbine 12, with respect to the speed of primary turbine 10, and preventing overspeeding of the former, an overspeed governor is provided which comprises the following elements.

A pair of fly-weights 230 are rotated by auxiliary drive shaft 35, which is driven through gear 20 by power turbine 12 (see FIG. 1). A spline 231 fixed to shaft 35, slidably engages a spool, pilot valve 232, thereby rotating said valve to prevent sticking. Valve 232 is slidably mounted in sleeve 233 whose interior is connected by a passage 234 with passage 100, whereby fuel under servo-pressure ($p_s$) enters the right-hand part of said sleeve. A passage 235 permits fuel under boost ($p_b$) to enter the left-hand part of sleeve 233 from reservoir 51. A conduit 236 connects the central portion of sleeve 233 with a cylinder 243 of the overspeed actuator described below, and a central land 237 of valve 232 registers with the port of conduit 236, when said valve is in its neutral position. Left end of valve 232 extends into a chamber 238 and terminates in an annular flange 239 whose face area is greater than the area of the right end of valve 232 which extends into reservoir 51. The left end of chamber 238 is provided with a screw-threaded, adjustable abutment 240 for a spring 241 which bears against flange 239, and said chamber is connected by a passage 242 with conduit 236.

Slidably mounted in cylinder 243 is a hollow piston 244, which is biased downwardly by a tension spring 245, and is connected to a spool, pilot valve 246, slidably mounted in cylinder 248, that is also slidably mounted in a sleeve 248a. Valve 246 is provided with lands 247 which register with the ports of conduits 249 and 250 which connect cylinder 248 with another cylinder 251. A conduit 252 connects cylinder 248 with passage 100, whereby fuel under servo-pressure ($p_s$) enters said cylinder, and a port 253 connects said cylinder 248 with reservoir 51.

Slidably mounted in cylinder 251 is a piston 254, having an upwardly extending rod 255 terminating in a screw-threaded adjustable extension 256 which is located, adjacent the end of the right horizontal arm of bell-crank lever 201, at a distance sufficient to just clear said arm when in its lowest operating position, except when piston 254 raises extension 256, as described below. A lever 257, pivoted to a fixed pivot 258, is articulately connected to cylinder 248 and rod 255, so that when piston 254 (and rod 255) are raised, by the admission of fuel under servo-pressure ($p_s$) into the lower end of cylinder 251 by the lowering of valve 246, said valve is raised by lever 257 to its neutral position which maintains piston 254 in its new higher position.

The operation of the overspeed governor, described above, is as follows. An increase in the speed of power turbine 12 causes fly-weights 230 to move outwardly, which pushes valve 232 to the left, in opposition to spring 241. Thereupon, land 237 of valve 232 uncovers conduit port 236 which admits fuel, under servo-pressure ($p_s$), from conduit 234 to cylinder 243, and raises piston 244, in opposition to tension spring 245, thereby raising valve 246. This admits fuel, under servo-pressure ($p_s$), from conduit 252 (through conduit 249) into the lower part of cylinder 251, and permits fuel to escape from the upper part of cylinder 251, through conduit 250 and the lower open end of cylinder 248, into reservoir 51, which causes piston 254 to rise and raise extension 256. Conversely, a decrease in the speed of power turbine 12 reverses the operation just mentioned and lowers extension 256.

Whenever the speed of power turbine 12 reaches its maximum selected value, the rise of extension 256, as just described, brings said extension into contact with the right arm of bell-crank lever 201, and further upward movement of extension 256 rotates lever 201 in a counter-clockwise direction, which reduces the flow area through main metering valve 61 as described hereinabove. The resulting decrease in fuel flow to the engines reduces the speed of turbine 12 to a point below its maximum selected value, whereupon the descent of extension 256 breaks its contact with lever 201 and normal speed governing is re-established. The maximum permissable speed of turbine 12 is determined by the setting of adjustable abutment 240 which determines the load on spring 241.

SPEED GOVERNING MECHANISM (MODIFIED FORM)

FIGURE 5 shows (on a somewhat larger scale) a modification of the speed governing mechanism shown in the left hand part of FIGURE 2, which may be used in place of that illustrated in FIGURE 2. This modification comprises essentially the addition of a hydraulic amplifier and a speed governor gain cam in the linkage arrangement of FIGURE 2. The amplifier permits a simplification of said linkage, gives more direct control of the main metering valve (61), and at the same time, reduces throttle torque and the force exerted on the 3-dimension cam (290), the governor gain cam provides a means for varying the governor gain, as a function of steady-state engine speed, in order to obtain optimum stability and response characteristics over the entire speed range. It will be understood that all of the control apparatus to the right of the left end portion of rod 188 (shown in FIGURE 5), is identical with that shown in FIGURE 2. Elements which are the same in FIGURE 5 as in FIGURE 2 are denoted by the same reference numerals (e.g., rod 188 and ball bearings 189).

As shown in FIGURE 5, the elements of the linkage arrangement are in the positions they occupy when the primary turbine 10 is operating in the steady-state phase at its maximum speed, for which the 3-dimension cam 290 is in its rightmost position. Cam 290 differs from cam 190 of FIGURE 2, in that the former (in addition to an acceleration contoured surface 291) is provided with a deceleration contoured surface 292, and also has a contoured cam surface 293 on a portion of its left end face, for temperature ($T_1$) compensation. Cam 290 is further provided with leftward extended arcuate portion, having a sector rack 294, engaging a gear wheel 295, mounted on a shaft 296, which is rotated through a limited angle by an arm 297, connected by rod 198 ($T_1$) bellows 199, as in FIGURE 2.

A three-arm bell-crank lever 301, fixedly mounted on rack shaft 128, carries, near the end of its left arm, a roller 302 which bears against contoured surface 291 of cam 290, when the engine (turbine 10) is operating in its acceleration phase, but is out of contact with said surface during steady-state and deceleration phases of engine operation. The lower end of the vertical arm of bell-crank lever 301 bears against a push-rod 303 which is slidably mounted in a piston rod 304, connected to a piston 305. A spring 306 biases push-rod 303 to the right, so that it follows the movement of its contacting arm. The right arm of bell-crank lever 301 is articulately connected by a link 307 to another bell-crank lever 308, which is mounted on a fixed pivot 309. The left horizontal arm of lever 308 carries a roller 310 which contacts contoured surface 292 of cam 290 during the deceleration phase of engine operation, and is out of contact during the steady-state and acceleration phases of operation. The left, upwardly-inclined arm of bell-crank lever 308 carries a speed governor gain cam 311 which is screw-adjustably secured thereon by set screws 312. A sleeve 313, which is slidably mounted in a fixed cylinder 313a, terminates at its left end in a gear 314 which engages a pinion 315, fixed to a shaft 316 that is connected to main drive shaft 34, whereby sleeve 313 is rotated to prevent sticking in cylinder 313a or to a spool valve 317, slidably mounted in said sleeve.

Cylinder 313a is connected by passages 318 and 319 with a cylinder 320, and by a conduit 321 with passage 100, whereby fuel under servo-pressure $(p_s)$ is introduced into cylinder 313a. Sleeve 313 is provided with annular grooves 322 and 323 which are connected by ports 324 and 325 with the interior of sleeve 313, whereby fuel may escape from the left end of cylinder 320 into reservoir 51 through the open left end of sleeve 313 when spool valve 317 moves to the right of its neutral position (as shown in FIGURE 5), so that its land 326 uncovers port 324; at the same time land 327 uncovers port 325 and admits fuel under pressure $(p_s)$ to the right end of cylinder 320, from conduit 321, through an annular groove and port 328 in sleeve 313 and passage 319. Fuel escapes similarly from the right end of cylinder 320, when spool valve 317 moves to the left of its neutral position, so that its land 327 uncovers the port 325; and at the same time land 326 opens port 324 and admits fuel under pressure $(p_s)$ from conduit 321 through groove 328 and passage 318 to the left end of cylinder 320.

When spool valve 317 moves to the right of its neutral position and admits fuel under pressure $(p_s)$ into the right end of cylinder 320 and fuel escapes from the left end of said cylinder into reservoir 51 wherein the lower pressure $(p_b)$ obtains, the pressure differential $(p_s-p_b)$ acting on piston 305 moves it to the left, which retracts rod 304 and follower 303 to the left. This permits bell-crank lever 301 to rotate in a clockwise direction and pull link 307 downward which rotates bell-crank lever 308 in a clockwise direction and moves roller 353 and sleeve 313 to the right, until the ports 324 and 325 are again closed by the registration of lands 326 and 327 therewith, whereupon no fuel enters or leaves either end of cylinder 320 and piston 305 is thereby hydraulically locked in its new position. Conversely, when spool valve 317 moves to the left of its neutral position, piston 305 moves to the right and pushes sleeve 313 to the left until ports 324 and 325 are closed by lands 326 and 327 of valve 317, whereupon piston 305 is similarly hydraulically locked in its new position.

Spool valve 317 is connected by a rod 329 (whose length is adjusted by a threaded sleeve 330) with a lever 331, having a slot 332 which engages a pin 333 on rod 329. Lever 331 is pivoted at 334 to a bell-crank lever 335, and engages at its lower end with an eye 336 in a rod 337 which is slidably mounted in a sleeve 338 and has threaded on its right end a cam follower 339. Sleeve 338 is held in fixed position by threaded engagement with a bracket 340 which connects and holds cylinders 313a and 320 in fixed, spaced relation to each other. A spring 341 in sleeve 338 biases cam follower 339 to the right and holds it in contact with cam 293.

Bell-crank lever 335 is mounted on a fixed pivot 342, and has a horizontal arm which contacts pin 216 which is moved by rotation of manually operated cam 218, fixed to shaft 36. The lower vertical arm of bell-crank lever 335 is biased to the left by a spring 343 and contacts an adjustable stop 344 which said lever is in a position corresponding to the maximum speed of the engine. The upper vertical arm of bell-crank lever 335 similarly contacts an adjustable stop 345 when said lever is in its minimum speed position. A coiled spring 346 is mounted on the end of the upper vertical arm of bell-crank lever 335 and engages lever 331 so as to bias the upper arm of said lever to the right.

Rigidly attached to the right end of sleeve 313 is the inner race of a pair of ball bearings 350 whose outer race is fixed in a housing 351 by a collar 352, screw-threaded into the left end of said housing. A spring 324, interposed between collar and the right end of cylinder 313a, biases housing 351 to the right and prevents its rotation with sleeve 313. The right end of housing 351 carries a roller 353 which is held in contact with the contoured surface of cam 311 by the thrust of spring 324.

The ratio of change of engine fuel flow with percent of change in engine speed $(dW_f/d\%N)$ is known as speed governor gain. It is desirable to have a flexible means of varying the governor gain $(dW_f/d\%N)$ as a function of the steady-state speed in order to obtain optimum stability and response characteristics over the entire speed range. Previous means of accomplishing this gain variation have included characterization of valve contours, variation of lever ratios within the governor linkage, and utilization of the non-linear force characteristics of the governor flyweights against speed. All of these means entail compromises of accuracy, sensitivity, and mechanical flexibility without giving the desired governor gain variation over the entire speed range. In our invention the aforesaid means is cam 311, which is incorporated in the feedback position of the throttle linkage system, and gives the desired flexibility without requiring major redesign if other gain characteristics should be found necessary for satisfactory stability and engine response.

*Operation of Governor Fuel-Proportioning Mechanism*

To increase engine speed, a clockwise rotation of the throttle input cam 218 produces a clockwise rotation of the bellcrank 335 and produces a corresponding initial clockwise rotation of the lever 331 about the instantaneous position of the pivot 336 on the speed-sense slide rod 337. The rod 337 moves to the right with increasing $N_1$ rotor speed and hence tends to rotate the lever 331 in the counterclockwise direction. The position of the upper end of lever 331 is therefore seen to be a function of the throttle input cam position and the speed sense slide position.

The upper end of lever 331 advances to the right, and moves to the right the pilot valve stem 317 of the positional follow-up hydraulic servo which causes the pilot valve sleeve 313 to closely follow the pilot valve stem 317. The positional follow-up servo consists of the pilot valve 317 with follow-up sleeve 313, power piston 305 actuated by the pilot valve, and a follow-up linkage connecting the power piston 305 to the pilot valve sleeve 313. The follow-up linkage consists of the "rock-shaft" 128, actuated by the power piston 305, the connecting link 307, the bellcrank lever 308, and the variable gain cam 311 which is continuously followed by the roller 353 mounted on the pilot valve sleeve 313. The rotation of the rock-shaft 128 provides one of the two displacement inputs to the fuel valve 61 actuating multiplier. The other input to the fuel valve actuating multiplier is a displacement from the $(P_1)$ servo 139 (FIGURE 2) which is a function of compressor inlet pressure (P₁), on bellows 155.

As the pilot valve stem 317 is advanced to the right by an advance in the throttle cam 218 calling for higher engine speed, hydraulic servo pressure ($P_s$) is ported through the pilot valve 317 to the right hand side of the power piston 305. At the same time, the left side of the piston 305 is vented to the case, which contains fuel at boost pressure ($P_b$). The power piston is thus caused by pressure forces to move to the left, allowing the rockshaft 128 to rotate clockwise until it is limited by the acceleration cam surface 291. Through the connecting link 307, the bellcrank 308 is also caused to rotate clockwise, thus allowing the roller 353 and sleeve 313 to advance to the right in following the surface of cam 311. The ratio of the sleeve 313 advance to the power piston 305 advance is characterized by the contour of cam 311. In conjunction with the metering valve 61 area vs. position characteristics and the position of the (P₁) servo 149, the governor gain ($dW_f/d\%N$) is determined by the contour of cam 311, and can be altered in any way desired to improve stability by altering the contour of cam 311. When the cam (311) is altered, a corresponding change is made in cam 218, so that the correct speed vs. steady-state fuel flow characteristics are maintained for all throttle positions.

When the throttle cam 218 is moved counter-clockwise in calling for reduced engine speed, the pilot valve stem 317 is caused to move to the left, causing the power piston 305 to move to the right and causing the rockshaft 128 and bellcrank lever 308 to rotate counter-clockwise until rotation is limited by the deceleration cam surface 292. The load applied to the deceleration cam surface 292 is limited by a preload spring assembly 303, 306 on the power piston shaft 304. The load applied to the acceleration cam surface 291 is limited to the fuel valve 61 return spring 120 load applied to the follow-up linkage through the fuel valve multiplier.

The (P₁) servo 139 amplifier is a force-balance type servo-mechanism which provides a high power-level displacement as a cam-contoured 126 function of absolute compressor inlet pressure (P₁) on bellows 155. (P₁) pressure is admitted to sealed chamber 156 containing evacuated bellows 155. The motion of the evacuated bellows 155 is transmitted through a sealing bellows and bellcrank 152 to a pilot valve 149 with a rotating sleeve 144 to minimize friction hysteresis. Displacement of the pilot valve 149, 150 from its null position causes servo pressure ($P_s$) to be ported to hydraulic power piston 139 which moves in a direction to equalize the moments on the bell crank 152 by changing the tension on the spring 161.

Linear translation of the power piston shaft 138 in proportion to (P₁) absolute is converted to $f(P_1\ abs.)$ by means of a (P₁) cam 126. The displacement of cam 126 is used to translate the ball rollers 121, 122 in a "nut-cracker" type of mechanical multiplier which actuates the fuel metering valve 61. The other input to the fuel valve multiplier is, as described above, the rotation of the rockshaft 128. The fuel metering valve 61 forces are partially balanced out by supplying pump discharge pressure to a piston 117 in line with the valve. Adjustable mechanical maximum and minimum stops 131, 132, limit the extreme positions of the fuel metering valve 161.

Large changes in the steady-state fuel flow required to maintain a given speed are produced by variations in inlet air temperature (T₁). Hence, it is desirable to reset the fuel flow as a function of (T₁), this is done by biasing the displacement of the speed-sense slide rod 337 as a function of (T₁) by means of a cam face 293 attached to the acceleration-deceleration cam 290. This cam is contoured particularly to maintain the take-off speed at rated value, and will have less importance at speeds below normal rated. A positive, adjustable stop 344 for the bellcrank 335 ensures the correct setting for turbine 10 take-off rotor speed.

When the engine is operating at an equilibrium speed in the steady-state, the bellcrank levers 301 and 308 are not in contact with either the deceleration or acceleration cam surfaces 291 or 292, and fuel flow changes then become directly controlled by the speed error, as measured by the departure of the upper end of lever 331 from the position it should be in at a given equilibrium speed at the corresponding throttle setting. The steady-state fuel flow change ($\Delta W_f$) for a given speed error ($\Delta N$) then may be expressed as:

$$\frac{\Delta W_f}{\Delta N} = f(N_1, N_s) \times f(P_1)$$

or by an equivalent expression:

$$\frac{\Delta\left(\frac{W_f}{f(P_1)}\right)}{\Delta N_1} = f(N_1, N_s)$$

where $N_1$ = Primary engine rotor (10) speed
$N_s$ = Power engine rotor (12) speed setting
$f(P_1)$ = Output of (P₁) servo (149)

and $f(N_1, N_s)$ is the geometrical relationship established by the linkage configuration, the throttle input cam 218, the contour of the variable gain cam 311, and the fuel metering valve 61 contour. In this design $f(N_1, N_s)$ is characterized to obtain optimum response and stability, taking into consideration the variation of engine time constant with speed. $f(P_1)$ is characterized to compensate automatically for the variation in engine gain ($\partial N/\partial W_f$) with altitude. In general, the critical stability conditions are encountered at sea-level, and governing stability improves with altitude, although engine response normally becomes slower.

*Deceleration Operation*

As shown in FIGURE 5, the elements are in their maximum steady-state speed position; that is, cam 218 is in its position of minimum throw, hence pin 216 is in its lowest position and bellcrank lever 335 is in its right-most position, with its lower vertical arm contacting stop 344, which precludes any further clockwise rotation of bellcrank lever 335. If now, cam 218 is rotated in a counter-clockwise direction (by retarding manual control lever 38 to the left), the increasing lift of cam 218 pushes pin 216 upward and rotates bellcrank lever 335 in a counter-clockwise direction. The upper vertical arm of bellcrank lever 335 then swings lever 331 to the left about its engagement 336 with rod 337 as a pivot, rod 337 being held stationary by follower 339 and cam 293 (unless temperature T₁ changes, as described hereinbelow). The resulting counter-clockwise rotation of lever 331 pulls rod 329 and valve 317 to the left. This causes piston 305 to move to the right, and rotate bellcrank lever 301 and rock shaft 128 in a counter-clockwise direction, which moves main metering valve 61 towards its closed position, as previously described hereinabove. The resulting decreased fuel flow reduces the speed of the engine to what is called for by the new position of cam 218, whereupon, the control apparatus becomes stabilized and steady-state operation at the desired reduced speed ensues.

When bell-crank lever 301 is rotated in a counter-clockwise direction, as described in the preceding paragraph, it raises link 307 and rotates bell-crank lever 308 counter-clockwise until roller 310 engages deceleration cam 291, which thereupon limits the further counter-clockwise rotation of bell-crank levers 308 and 301 and thereby limits the reduction in the rate of fuel flow to what is permitted by the contour of cam 291, which is such as to preclude burner blowout. When steady-state operation at the desired reduced speed ensues, bell-crank lever 308 is rotated clockwise by the movement of sleeve 312 to the right until roller 310 is disengaged from cam 291 (as shown in FIGURE 5).

*Acceleration Operation*

Assuming the engine is operating in its steady-state phase, at some speed between its maximum and minimum, as determined by stops 344 and 345, bell-crank lever 335 will be out of contact with both of said stops, and may therefore move in either direction. If now (by advancing manual control lever 38 to the right), cam 218 is rotated in a clockwise direction, thus reducing its lift, pin 216 will move down and spring 343 will rotate bell-crank lever 335 in a clockwise direction which moves valve 317 to the right and piston 305 to the left, whereupon bell-crank lever 301 and shaft 128 are rotated clockwise, thus opening main metering valve 61 and increasing engine fuel flow and speed, in the manner described above. At the same time, the clockwise rotation of bell-crank lever 301 raises roller 302 and brings it in contact with contoured surface 292 of cam 290, which limits the amount of clockwise rotation of bellcrank lever 301, and thus the rate of fuel flow to the engine is limited to that permitted by the contour 292, which is such as to permit the maximum engine acceleration fuel flow possible without causing compressor stall.

*Temperature ($T_1$) Modifier*

In the foregoing description of operation during the steady-state, deceleration and acceleration phases, temperature ($T_1$) of the air entering the engine has been assumed to remain constant, so that the position of pivot 336 of lever 331 does not change. As shown in FIGURE 5, cam follower 339 and pivot 336 are in their rightmost positions, which they occupy when the temperature ($T_1$) is at its maximum selected value. If now temperature ($T_1$) falls, bellows 199 contracts and pulls rod 198 upward, which rotates shaft 296 and gear wheel 295 in a clockwise direction (as viewed from its left). This rotates cam 290 counter-clockwise which causes follower 339 to ride up cam 293, which moves rod 337 and pivot 336 to the left. This rotates lever 331 about in pivot 334 in a clockwise direction, which moves pilot 317 to the right and piston 305 to the left, whereupon bell-crank lever 301 and shaft 128 rotate clockwise, thus opening main metering valve 61 and increasing engine fuel flow, to compensate for the increase in air density caused by its lower ($T_1$) temperature. Conversely, a rise in ($T_1$) temperature reverses the foregoing movements of elements 199, 198, 296, 295, 290, 293, 339, 337, 336, 331, 317, 305, 301, 128 and 61, and reduces the engine fuel flow to compensate for the decrease in air density due to the rise in temperature ($T_1$).

*Overspeed Governor (Power Turbine)*

The power turbine overspeed governor mechanism 230–258 is the same as described in columns 13 and 14, and operates in the same manner as there stated. That is to say, when power turbine 12 reaches its maximum permissible speed, stop 256 rises to a point where it contacts the right horizontal arm of bell-crank lever 301 and prevents its further rotation in a clockwise direction, which limits the speed of turbine 12 to its selected maximum safe value by limiting the speed of primary turbine 10 which functions as a gas generator for power turbine 12.

EMERGENCY CONTROL SYSTEM

Jet engine fuel regulators heretofore in use generally regulate the fuel flow to the engine only during its normal operation, and an additional fuel regulator is thus needed to regulate said fuel flow during emergency operation, when the normal fuel regulator has failed. Such an arrangement not only necessitates two separate fuel supply systems, with interconnecting conduits that are subject to leakage and breakage, but also requires two separate fuel regulators—all of which adds to the bulk, weight, cost, and complication of the fuel supply system.

In order to avoid the disadvantages attendant upon the use of separate normal and emergency fuel regulators, our invention provides a single-package fuel regulator, which includes means for regulating the fuel flow to the engine under both normal and emergency conditions, together with a built-in change-over valve mechanism, whereby the pilot, by changing the position of a switch (88) in the cockpit, may bring the emergency control system into operation at any time (e.g., upon failure or trouble developing in the normal control system). There is thus required only one fuel supply system and one fuel regulator for all operating conditions.

Our emergency control system comprises fuel pump 52, check valve 54, passages 55 and 57, change-over valve 59, passage 69, valves 63 and 64, and passage 65—all as previously mentioned in column 7.

As with the normal control system, our emergency control system meters the fuel flow to the engine by means of an emergency pressure regulating valve (71) which maintains the metering head ($p_{fe} - p_m$) across an emergency metering valve (63) at a selected constant value, and the fuel flow to the engine is controlled solely by varying the flow area through said valve.

Bypass valve 71 is held in equilibrium by the fuel pressure ($p_{fe}$) in passage 70, acting to the right on a diaphragm 400 attached to said valve, opposed by a spring 401, whose force is adjusted by an adjustable abutment 402, and the metered fuel pressure ($p_m$) in a chamber 403, which communicates through passage 111 with passage 62. The fuel pressure differential ($p_{fe} - p_m$) acting on diaphragm 400 is determined by the force of spring 401, which in turn is fixed by the setting of abutment 402, and since the metering head ($p_{fe} - p_m$) across valve 63 is the same as the fuel pressure differential ($p_{fe} - p_m$) acting on diaphragm 400, said metering head is maintained at a substantially constant value, as determined by the setting of abutment 402. Also, since metering head ($p_{fe} - p_m$) remains constant, the rate of fuel flow to the engine at any instant of emergency operation is determined solely by the position of valve 63 at that time.

Valve 63 is slidably mounted in a cylindrical block 404 which in turn is slidably mounted in a cylinder 405 to which passage 69 is connected. A spring 406, interposed between block 404 and the back face of valve 63, biases said valve to the left. The lower side of block 404 is provided with a rack 407 whose teeth engage a pinion 408 which is fixedly mounted on manual control shaft 36, so that, when throttle handle 38 is retarded (to the left), pinion 408 rotates in a counter-clockwise direction and moves valve 63 toward its closed position, thereby reducing the fuel flow to the engine and hence engine speed; and vice versa.

The upper left-hand part of block 404 has a bevelled portion 409 which coacts with the left edge 410 of an annular groove 411 connecting with passage 69, so that, as block 404 is moved to the left (by retarding control handle 38), the flow area from passage 69 to 62 is gradually reduced, whereby the fuel flow to engine is varied by moving control 38. Bevelled portion 409 and edge 410 thus constitute the means for manually controlling the rate of fuel flow to the engine during the greater part of the emergency range of operation.

As block 404 is moved to the left, valve 63 also moves to the left towards its seat, which reduces the flow area around said valve. However, valve 63 does not control the fuel flow from passage 69 to passage 65, until valve 63 is very near its seat, when the flow area around said valve is less than the flow area between bevelled portion 409 of block 404 and edge 410 of groove 411, whereupon valve 63 takes over the control of fuel flow to the engine, when a fine adjustment of the metering flow area is required for slow (idling) engine speed. The fuel flow past valve 63 (when said valve is in control of the fuel supply to the engine), corresponds to the idling fuel flow through a notch 61a, in the seat of main metering valve 61, which determines the idling fuel flow in the normal control system when valve 61 is in closed position.

When valve 63 reaches its seated (closed) position, block 404 may be moved further to the left (by retarding control handle 38) until bevelled part 409 contacts edge 410, whereupon all fuel flow through the emergency system is shut off. This last movement of block 404, which is permitted by the compression of spring 406, permits said block to function as a stopcock for stopping all emergency fuel flow when the engine is shut down.

In connection with the foregoing description of the emergency control system, it is to be particularly noted that the emergency fuel flow is coordinated with the normal fuel flow by deriving the controlling pressures in both the normal and the emergency system from corresponding pressures common to both systems. Thus, the pressures ($p_f$) and ($p_{fe}$) in passages 66 and 70 are derived from the same pressure in passage 55; and the same pressure ($p_m$) actuates both valves 67 and 71; the same pressure ($p_{ff}$) actuates valves 58 and 59; and valve 64 functions in common for both the normal and emergency systems.

While we have shown and described the preferred embodiments of our invention, we desire it to be understood that we do not limit ourselves to the detail construction and arrangement of elements disclosed by way of illustration, as these may be changed and modified by those skilled in the art without departing from the spirit of our invention or exceeding the scope of the appended claims.

We claim:

1. In a fuel control device for controlling the flow of fuel to the combustion chamber of an aircraft turbojet engine having a primary turbine for driving an air compressor and a power turbine for propelling said aircraft; a fuel supply pump driven by the primary turbine, a conduit connecting said pump to said chamber, a first valve in said conduit for regulating the fuel flow to said chamber, a first speed governor, independent of said pump, driven by said primary turbine, and acting on said valve, for controlling the speed of said primary turbine; a second speed governor driven by said power turbine, and means responsive to said second governor for limiting the action of said first governor on said valve, so that the speed of said power turbine is limited by the speed of said primary turbine.

2. An aircraft turbojet engine fuel control apparatus comprising; a conduit supplying fuel to said engine, a metering restriction in said conduit, first linearly movable means for varying the flow area through said restriction, second manually-operable means, and third engine speed-responsive means, for varying the linear position of said first means; fourth cam means reversibly positionable in two different directions and having a warped surface, for limiting the positioning by said second means of said first means; fifth means, responsive to engine induction air temperature, for varying the adjustment of said fourth means in one direction, in accordance with said temperature; and sixth means for varying the adjustment of said fourth means, in the other direction, in accordance with engine speed, whereby the fuel flow to said engine is conjointly controlled in accordance with the position of said second means, engine speed, and said temperature; said third means including a centrifugal governor, and said fourth means being operatively associated with a seventh contoured cam means for varying the gain ($dW_f/d\%N$) of said governor, as a preselected function of steady-state engine speed, thereby producing optimum stability and response characteristics of said governor, over the entire speed range of said engine.

3. Control apparatus according to claim 2, wherein said seventh cam means are operatively associated with means for modifying the effect of the adjustment of said fourth means by said fifth means, as a preselected function of said temperature; the contour of said seventh cam means being so shaped as to schedule out the effect of the droop of said governor, which is caused by variations of said temperature.

References Cited in the file of this patent

UNITED STATES PATENTS

| | | |
|---|---|---|
| 2,422,808 | Stokes | June 24, 1947 |
| 2,603,063 | Ray | July 15, 1952 |
| 2,622,393 | Edwards et al. | Dec. 23, 1952 |
| 2,629,982 | Hooker | Mar. 3, 1953 |
| 2,674,847 | Davies et al. | Apr. 13, 1954 |
| 2,691,268 | Prentiss | Oct. 12, 1954 |
| 2,705,047 | Williams et al. | Mar. 29, 1955 |
| 2,720,751 | Kunz | Oct. 18, 1955 |
| 2,759,549 | Best | Aug. 21, 1956 |
| 2,779,422 | Dolza et al. | Jan. 29, 1957 |
| 2,836,957 | Fox | June 3, 1958 |